US012220738B2

(12) United States Patent
Stephan

(10) Patent No.: US 12,220,738 B2
(45) Date of Patent: Feb. 11, 2025

(54) SYSTEMS AND METHODS FOR COMPENSATING FOR SPRING BACK OF STRUCTURES FORMED THROUGH INCREMENTAL SHEET FORMING

(71) Applicant: THE BOEING COMPANY, Chicago, IL (US)

(72) Inventor: Andrew Jon Eugene Stephan, Brisbane (AU)

(73) Assignee: The Boeing Company, Chicago, IL (US)

( * ) Notice: Subject to any disclaimer, the term of this patent is extended or adjusted under 35 U.S.C. 154(b) by 376 days.

(21) Appl. No.: 16/888,956

(22) Filed: Jun. 1, 2020

(65) Prior Publication Data

US 2021/0370377 A1 Dec. 2, 2021

(51) Int. Cl.
*G06F 30/20* (2020.01)
*B21D 31/00* (2006.01)
*G05B 17/00* (2006.01)

(52) U.S. Cl.
CPC ........... *B21D 31/005* (2013.01); *G05B 17/00* (2013.01)

(58) Field of Classification Search
CPC .................. B21D 31/005; G05B 17/00
See application file for complete search history.

(56) References Cited

U.S. PATENT DOCUMENTS

| 2013/0103177 A1 | 4/2013 | Cao |
| 2015/0134093 A1 | 5/2015 | Dos Reis Alipio Da Cruz |
| 2016/0288184 A1 | 10/2016 | Zhao |

OTHER PUBLICATIONS

Hirt, G., et al. "Forming strategies and process modelling for CNC incremental sheet forming." CIRP Annals 53.1 (2004): 203-206.*
Wang, Jyhwen, et al. "Blank optimization for sheet metal forming using multi-step finite element simulations." The International Journal of Advanced Manufacturing Technology 40.7 (2009): 709-720.*
Lan, F., J. Chen, and J. Lin. "A method of constructing smooth tool surfaces for FE prediction of springback in sheet metal forming." Journal of Materials Processing Technology 177.1-3 (2006): 382-385.*
Lu, Haibo, et al. "Model predictive control of incremental sheet forming for geometric accuracy improvement." The International Journal of Advanced Manufacturing Technology 82.9-12 (2016): 1781-1794.*
Meier H. et al: "Increasing the part accuracy in dieless robt-based incremental sheet metal forming", CIRP Annalys, Elsevier BV, NL, CH, Fr. vol. 58, No. 1, Jan. 1, 2009.
Extended European Search Report for EP 21171126.2-1205, dated Oct. 18, 2021.

(Continued)

*Primary Examiner* — Nithya J. Moll
(74) *Attorney, Agent, or Firm* — Joseph M. Butscher; The Small Patent Law Group LLC

(57) ABSTRACT

An incremental sheet forming system and method are configured to form a structure through an incremental sheet forming process. The incremental sheet forming system and method include a forming control unit that compensates for spring back of a structure to be formed through the incremental sheet forming process.

29 Claims, 7 Drawing Sheets

(56) References Cited

OTHER PUBLICATIONS

Anggono A.D., Siswanto W.A. and Omar, B. Combined method of spring-forward and spring-back for die compensation acceleration. 2011 4th International Conference on Modelling, Simulation and Applied Optimization. Annealing, https://www.researchgate.net/publication/216224199_Combined_method_of_spring-forward_and_spring-back_for_die_compensation_acceleration.

Zhang et.al Springback reduction by annealing for incremental sheet forming. Procedia Manafacturing, 5(44) 2016, https://www.sciencedirect.com/science/article/pii/S2351978916300634.

Lu, H. Investigation of Control of the Incremental Forming Processes. Doctral Thesis, The University of Queensland 2016, https://espace.library.uq.edu.au/view/UQ:612878.

* cited by examiner

SYSTEMS AND METHODS FOR COMPENSATING FOR SPRING BACK OF STRUCTURES FORMED THROUGH INCREMENTAL SHEET FORMING

FIELD OF THE DISCLOSURE

Embodiments of the present disclosure generally relate to systems and methods for compensating for spring back of structures formed through incremental sheet forming.

BACKGROUND OF THE DISCLOSURE

Certain structures are formed through incremental sheet forming. In particular, incremental sheet forming provides a method of forming thin structures from metal. A forming tool typically includes a round, blunt operative head that is pushed or otherwise urged against a surface of sheet metal that is suspended in a clamp, jig, or the like to provide a modified three-dimensional shape.

When a piece of sheet metal is formed, an amount of strain in the sheet metal is elastically recovered, which is known as spring back. A known method for compensating for spring back with respect to forming processes over a die is to modify a shape of the tooling in an iterative way until a part of sufficient geometric accuracy is produced. Such process can be performed virtually by first simulating the process, then by comparing the simulated result with the expected result. The die can then be modified to invert the offset.

However, spring forward compensation (that is, compensating for spring back) typically cannot be applied to incremental sheet forming because a small change in geometry can lead to a large change in a topology of the toolpath, which can have unexpected effects on the resulting geometry of the formed part. For example, in incremental sheet forming, a small bump can completely change the topology of a toolpath, and a separate island of material may be formed in the resulting part, which has numerous drawbacks. First, tool engagement and retraction may leave a mark on the part. Second, the formation of the island of material can leave a bump in the sheet of material, which may render it unusable or otherwise unacceptable. Third, the bump can re-order which parts of the sheet are formed, which can affect workflow, such as by changing how the sheet behaves during the forming process. Such changes can ultimately invalidate any corrective steps.

SUMMARY OF THE DISCLOSURE

A need exists for a system and method for compensating for spring back in an incremental sheet forming process of forming a structure. That is, a need exists for a system and method of spring forward compensation during incremental sheet forming of a structure. Further, a need exists for a system and method of maintaining a toolpath during an incremental sheet forming process while also compensating for spring back to form a desired structural shape.

With those needs in mind, certain embodiments of the present disclosure provide an incremental sheet forming system that is configured to form a structure through an incremental sheet forming process. The incremental sheet forming system includes a forming control unit that compensates for spring back of a structure to be formed through the incremental sheet forming process. For example, the forming control unit compensates for the spring back by modifying at least a portion of a toolpath of a forming tool that is used to form the structure based on the spring back.

In at least one embodiment, the forming control unit determines a target shape for the structure to be formed, and simulates an incremental sheet forming operation in relation to the target shape. For example, the forming control unit compares differences between the target shape and a resulting structure from the incremental sheet forming operation to determine one or more offsets that compensate for the spring back. The one or more offsets relate to force vectors (that is, magnitudes and directions of forces) that oppose the spring back. The forming control unit may virtually simulate the incremental sheet forming operation without a forming tool physically operating on the structure.

In at least one embodiment, the forming control unit determines a geometric error over an entirety of a simulated structure. The forming control unit offsets points on contours normal to a target geometry in response to the geometric error being greater than a predetermined threshold. The forming control unit determines if any set of consecutive contours has a maximum vertical deviation greater than a maximum step-down after the forming control unit offsets the points. In response to there being at least one set of consecutive contours that has a maximum vertical deviation that exceeds the maximum step-down, the forming control unit inserts at least one compensating contour between a target contour and at least one contour that has a maximum vertical deviation that exceeds the maximum step-down. The forming control unit further maps the compensating contour onto the structure to form a compensated geometry.

In at least one embodiment, the forming control unit maps contours, with at least one surface of the structure.

In at least one embodiment, the incremental sheet forming also includes the forming tool. The forming tool is configured to follow the toolpath, as modified, to form the structure.

Certain embodiments of the present disclosure provide an incremental sheet forming method that is configured to form a structure through an incremental sheet forming process. The incremental sheet forming method includes compensating, by a forming control unit, for spring back of a structure to be formed through the incremental sheet forming process.

In at least one embodiment, said compensating includes determining a target shape for the structure to be formed, and simulating an incremental sheet forming operation in relation to the target shape. Said compensating further includes comparing differences between the target shape and a resulting structure from the incremental sheet forming operation to determine one or more offsets that compensate for the spring back. Said simulating may include virtually simulating the incremental sheet forming operation without a forming tool physically operating on the structure.

In at least one embodiment, said compensating includes determining a geometric error over an entirety of a simulated structure. Said compensating further includes offsetting points on contours normal to a target geometry in response to the geometric error being greater than a predetermined threshold. Said compensating further includes determining if any set of consecutive contours has a maximum vertical deviation greater than a maximum step-down after said offsetting. Said compensating further includes, in response to there being at least one set of consecutive contours that has a maximum vertical deviation that exceeds the maximum step-down, inserting at least one compensating contour between a target contour and at least one contour that has a maximum vertical deviation that exceeds the maximum step-down. Said compensating further includes mapping the compensating contour onto the structure to form a compensated geometry.

In at least one embodiment, said compensating includes mapping contours with at least one surface of the structure.

In at least one embodiment, said compensating includes modifying at least a portion of a toolpath of a forming tool that is used to form the structure based on the spring back.

DETAILED DESCRIPTION OF THE DISCLOSURE

Figure 1:
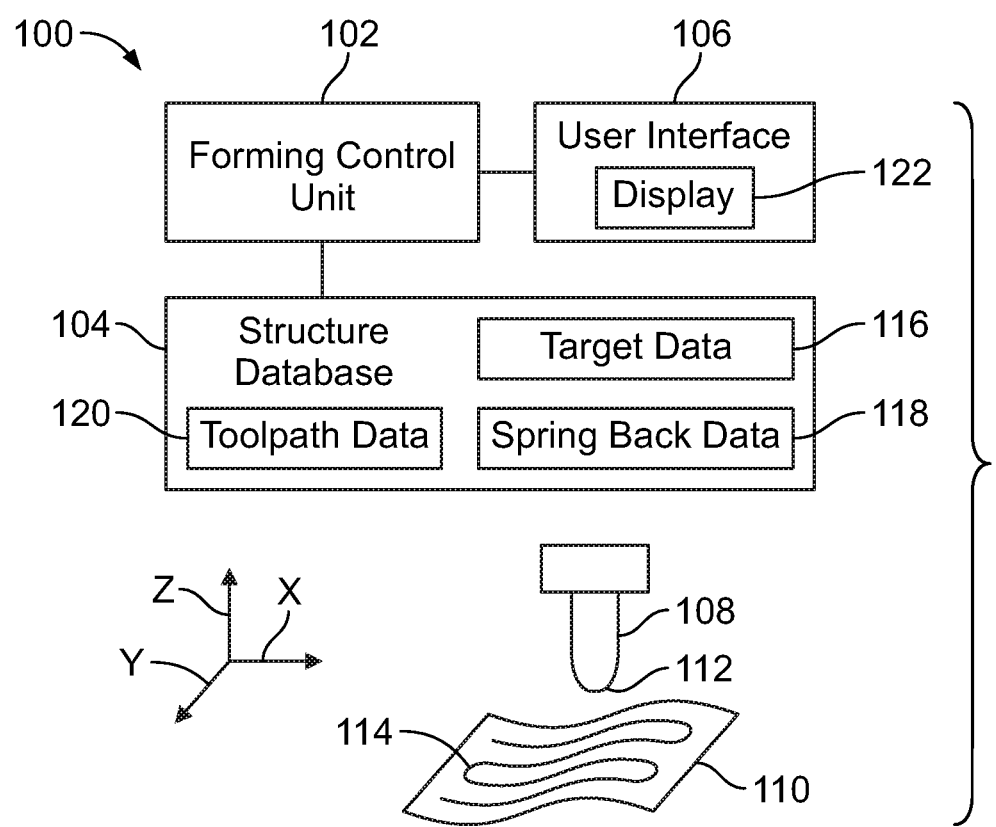
FIG. 1 illustrates a schematic block diagram of an incremental sheet forming system, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Certain embodiments of the present disclosure provide an incremental sheet forming system and method that includes a forming control unit that is configured to compensate for spring back of a structure to be formed. In at least one embodiment, the forming control unit maps contours of the structure, instead of just mapping the surface and re-cutting contours, thereby leading to non-z-level paths. In at least one embodiment, the forming control unit continually inserts paths between pairs of undesired toolpaths, such as by referencing a library of contours with respect to a target (desired) shape, and mapping all of them at every step, or by carrying around the original z-level of each path, and generating new paths between undesired pairs of contours on the target shape.

Certain embodiments of the present disclosure provide a system and a method for correction for spring back during incremental sheet forming of a structure. The system and method include calculating a geometric error over the entire part, modifying the geometry based on the error, mapping the original toolpath onto the new geometry and, finally, inserting additional toolpath contours if appropriate. In at least one embodiment, the toolpath may be modified instead of regenerating the toolpath at each repetition of the compensation.

In at least one embodiment, embodiments of the present disclosure provide a system and a method that corrects the error associated between a fabricated part shape and a designed target shape due to spring back of the part in incremental sheet forming. To reduce the error, a forming control unit runs a simulation (or an actual physical forming pass) to determine how an end product will look and determines geometric error. If the error is unacceptable, the forming control unit modifies the target geometry by pushing the target geometry in the opposite direction of the error, such that the forming tool (such as a forming stylus) pushes the target geometry in the opposite direction of the error. The original toolpath is then mapped onto this new geometry. In at least one embodiment, if after modification of a current set of contours a distance (such as a height) is too large between the contours, additional contours may be inserted.

In incremental sheet forming, the toolpath is given as a discrete set or points which may be connected by straight lines. These points lie on a surface, called the tool offset surface. Corresponding to these toolpath points are contact points, which are where the forming tool touches the part geometry for a given contact point. These points also lie on a surface, called the sheet offset surface, for which there is a 1:1 correspondence with the tool offset surface. To map the toolpath, the same transformation is applied to the contact points as to the target geometry, or vice versa. The compensation algorithm modifies the target geometry by offsetting, for example normally. Because the sheet offset surface is defined by offsetting the target geometry, the sheet offset can be offset directly. Once this occurs, the forming control unit can recompute the points on the tool offset surface that correspond to the contact points, and connects those by straight line segments to generate the full toolpath.

FIG. 1 illustrates a schematic block diagram of an incremental sheet forming system 100, according to an embodiment of the present disclosure. The incremental sheet forming system 100 includes a forming control unit 102 in communication with a structure database 104, such as through one or more wired or wireless connections, and a user interface 106, such as through one or more wired or wireless connections. The forming control unit 102 may be co-located with one or both of the structure database 104 and/or the user interface 106. Optionally, the forming control unit 102 may be remotely located from one or both of the structure database 104 and/or the user interface 106. In at least one embodiment, a forming tool 108 includes operative components, such as motors, that are controlled by a controller or control unit, which may be separate and distinct from the forming control unit 102.

The incremental sheet forming system 100 also includes the forming tool 108 that is configured to operate to form a structure 110. In at least one embodiment, the forming tool 108 is a forming stylus having a rounded, blunted operative end 112 that is configured to exert force into the structure 110 to form various features therein and/or thereon (such as curves, bends, indentations, and/or the like). The forming tool 108 operates on the structure 110 over a toolpath 114 to form a desired shape of the structure 110.

In at least one embodiment, the forming control unit 102 is in communication with the forming tool 108, such as through one or more wired or wireless connections. The forming control unit 102 is configured to operate the forming tool 108 to form the desired shape of the structure 110, which is formed of sheet metal, for example. Alternatively, the forming control unit 102 may not be in communication with the forming tool 108 or configured to operate the forming tool 108.

The structure database 104 stores various data. For example, the structure database 104 stores target data 116, spring back data 118, and toolpath data 120. The target data 116 includes information regarding a target or desired structure to be formed. For example, the target data 116 includes information regarding the size and shape of the structure 110 as desired to be formed.

The spring back data 118 includes information regarding spring back effects when force is exerted into the structure 110. For example, as a force is exerted into a portion of the structure 110, the elasticity of the structure 110 causes a responsive spring back.

The toolpath data 120 includes information regarding a path for the forming tool 108 to follow to form the structure 110. The toolpath data 120 may include information regarding a target or desired toolpath and a compensated toolpath, which includes modifications to offset spring back of the structure 110. For example, the offsets relate to force vectors (magnitudes and directions) that oppose the spring back (for example, the force vectors are opposite (at least partially in magnitude and direction) from the force vectors of the spring back force).

The user interface 106 includes a display 122, such as a monitor, television, touchscreen, and/or the like. The user interface 106 and the forming control unit 102 may be part of a computer workstation, for example. In at least one other embodiment, the forming control unit 102 and the user interface 106 may be part of a handheld device, such as a smart tablet, smart phone, laptop computer, or the like.

In operation, the forming control unit 102 determines a target or desired shape for the structure 110. For example, the forming control unit 102 can retrieve target shape data from the target data 116. The forming control unit 102 then simulates an incremental sheet forming operation on a virtual representation of an initial structure, such as a piece of sheet metal. For example, the forming control unit 102 may perform a virtual incremental sheet forming operation on the initial structure without the forming tool 108 physically operating on the structure 110. In general, the forming control unit 102 determines a target shape for the structure to be formed, and simulates an incremental sheet forming operation in relation to the target shape.

During the initial simulated forming operation, the forming control unit 102 operates on the initial structure over a toolpath to form a resulting structure. Spring back data 118 regarding the structure allows the forming control unit 102 to determine spring back effects during the forming process. The forming control unit 102 compares the resulting structure after spring back with the target structure. The forming control unit 102 determines the differences between the target structure and the resulting structure. The forming control unit 102 then offsets the differences between the target structure and the resulting structure to compensate for the spring back. The forming control unit 102 compares differences between the target shape and a resulting structure from the incremental sheet forming operation to determine one or more offsets that compensate for the spring back. In this manner, the forming control unit 102 compensates for differences that occur due to spring back to modify forming parameters (such as exerted force into the structure). As such, the forming control unit 102 determines a spring back compensated forming plan, which includes a toolpath and exerted forces over the toolpath, that is to be used by the forming tool 108 to form the structure 110 having a desired shape. The spring back compensated forming plan offsets spring back so that the structure 110 is formed having the desired shape, instead of an undesirable shape due to spring back effects.

In at least one embodiment, during an initial setup, the forming control unit 102 communicates with the structure database 104 to determine various aspects of the structure 110. For example, the target data 116 includes a desired part geometry (that is, desired size and shape), as well as the geometry of the forming tool 108.

The forming control unit 102 also determines a maximum step-down, which is a predetermined maximum distance between toolpath segments in a Z direction. The maximum step-down may be stored in the structure database 104, and/or a memory of or coupled to the forming control unit 102. For example, the maximum step-down may be 10 millimeters or less. In an example, the maximum step-down is between 5 millimeters and 10 millimeters. Optionally, the maximum step-down may be greater than 10 millimeters.

The forming control unit 102 also determines a target geometric tolerance, which is a predetermined tolerance in relation to spring back of the structure 110. The target geometric tolerance may be stored in the structure database 104, and/or a memory of or coupled to the forming control unit 102. For example, the target geometric tolerance is a predetermined tolerance below which there is no need for a spring back compensation offset. For example, the predetermined tolerance may be 0.05 millimeters or less. In such an example, if a resulting spring back is less than 0.05 millimeters, the forming control unit 102 does not compensate for the spring back. If, however, the resulting spring back exceeds the target geometric tolerance, the forming control unit 102 compensates for the spring back.

In at least one embodiment, a method of compensating for spring back of a structure formed by incremental sheet forming begins by the forming control unit 102 simulating an incremental sheet forming process on the structure. For example, the forming control unit 102 performs the simulated incremental sheet forming process virtually, without the forming tool 108 physically operating on the structure 110. During the simulated incremental sheet forming process, the forming control unit 102 operates a virtual forming tool on a simulated structure using a standard toolpath, such as may be stored in the structure database 104. During such operation, the forming control unit 102 determines spring back effects with respect to the simulated structure. In at least one embodiment, instead of virtual simulation, the forming control unit 102 may operate the forming control unit 102 on a test structure. As such, the simulated incremental sheet forming may be with respect to a virtual forming tool and simulated structure, and/or with respect to the forming tool 108 and a test structure, such as a test version of the structure 110.

The forming control unit 102 then determines the geometric error over an entirety of the simulated structure. The geometric error is the difference between the structure as desired to be formed, and the resulting structure caused by spring back as operated on during the simulation. For example, the geometric error relates to differences (such as in terms of sizes, heights, and the like) in corresponding contours between the structure as desired to be formed and the structure exhibiting spring back. If the resulting geometric error is acceptable (such as within the target geometric tolerance), the forming control unit accepts the results, and the forming tool 108 may then operate on the structure 110 in accordance with the simulated incremental sheet forming process.

Figure 10:
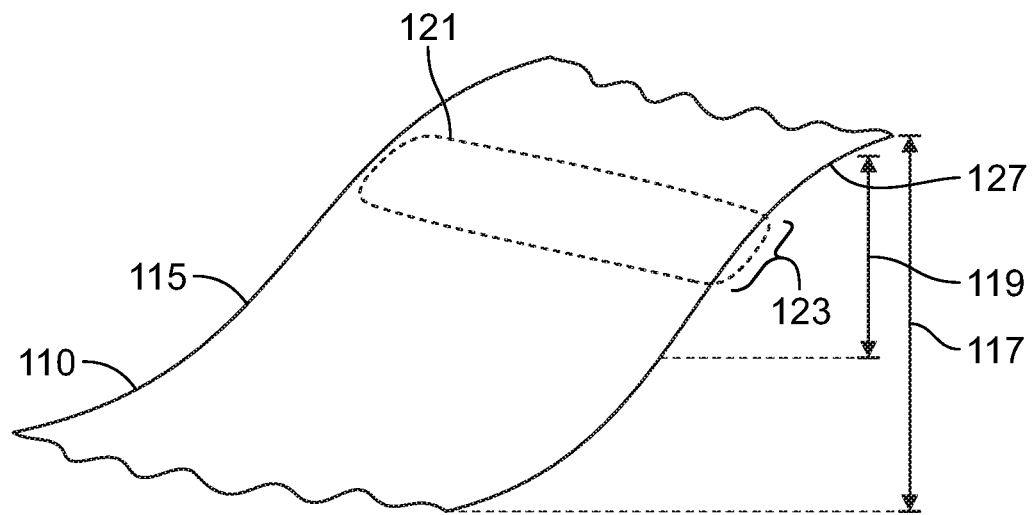
FIG. 10 illustrates a side view of a set of consecutive contours having a maximum vertical deviation greater than a maximum step-down.

If, however, the geometric error is not acceptable (such as exceeding the target geometric tolerance), the forming control unit 102 offsets points on contours (for example, all contours) normal to a target geometry as a fraction of local geometric error. Then, for the current contour set (that is, that of the resulting structure), the forming control unit 102 determines if any set of consecutive contours 115 has a maximum vertical deviation 119 greater than the maximum step-down 117 (as shown in FIG. 10). If there are no sets of consecutive contours that has a maximum vertical deviation greater than the maximum step-down, the forming control unit 102 returns to simulating the incremental sheet forming process.

If, however, there is at least one set of consecutive contours that has a maximum vertical deviation that exceeds the maximum step-down, the forming control unit 102 may then insert a compensating contour 121 between the target contour (that is, the contour as desired) and the contour 115 that has a maximum vertical deviation 117 that exceeds the maximum step-down 119 (as shown in FIG. 10). The forming control unit 102 then maps the compensating contour onto the structure to form a new, compensated geometry. The forming control unit 102 then continues to iteratively perform such operations until all surfaces have been analyzed.

In at least one embodiment, a surface is first modified, and contact points are carried around with the modification. From modified contact points, tool offset points can be recomputed. In this way, the toolpath may be mapped onto a new geometry.

As shown in the simplified example of FIG. 10, one or more offsets 123 compensate for spring back effects. A geometric error 127 in a simulated structure may be caused by spring back.

As described herein, embodiments of the present disclosure provide the forming control unit 102, which is configured to compensate for spring back in relation to incremental sheet forming processes of forming structures. The forming control unit 102 does not merely map the surface and re-cut contours. In at least one embodiment, the forming control unit 102 maps contours with the surface of the structure 110, thereby leading to non-z-level paths. In at least one embodiment, the forming control unit 102 inserts paths (such as iteratively and/or cumulatively) between pairs of undesirable toolpaths.

Figure 11:
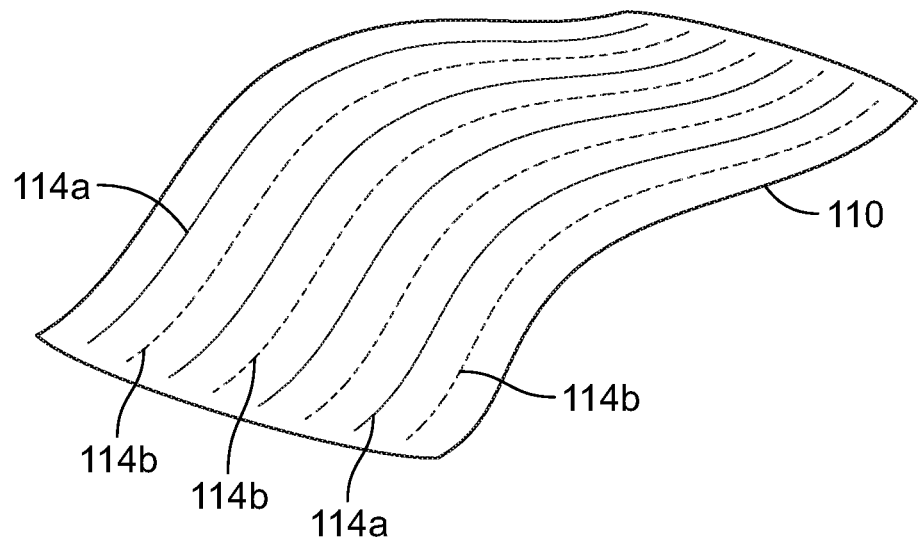
FIG. 11 illustrates a simplified diagram of a structure having an original toolpath and a modified toolpath.

In at least one embodiment, the forming control unit 102 modifies the toolpath 114 in order to compensate for spring back, instead of regenerating, at each iteration of the compensation. For example, the forming control unit 102 modifies at least a portion of the toolpath 114 of the forming tool 108 that is used to form the structure 110 based on the spring back. In at least one embodiment, when geometric errors are not large, the forming control unit 102 can retain small perturbations in the toolpath, instead of generating new topologies in the toolpath. As an example, FIG. 11 illustrates a simplified diagram of a structure 110 having an original toolpath 114*a* and a modified toolpath 114*b*.

Figure 2:
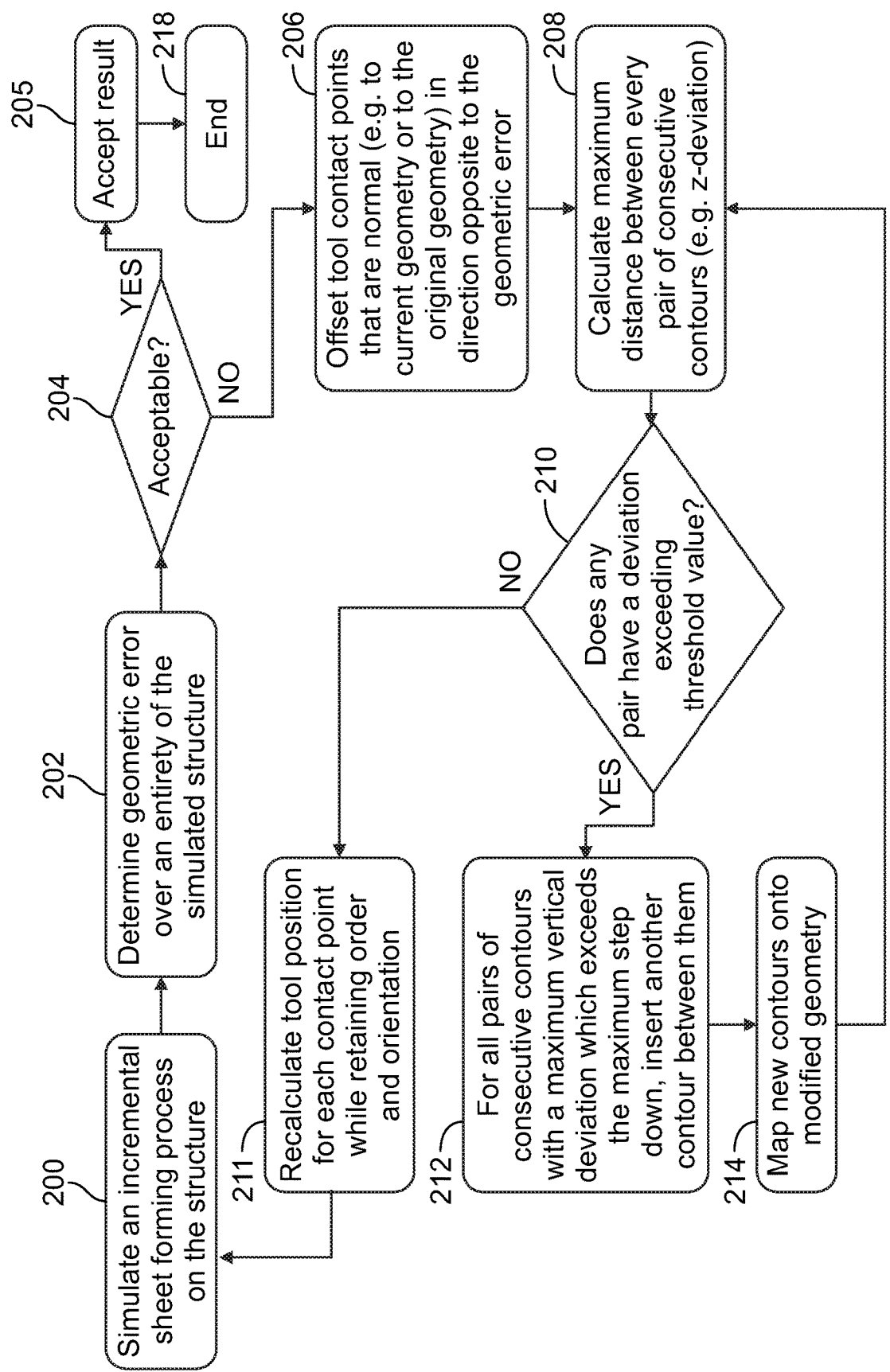
FIG. 2 illustrates a flow chart of a spring back compensation algorithm for incremental sheet forming, according to an embodiment of the present disclosure.

FIG. 2 illustrates flow chart of a spring back compensation algorithm for incremental sheet forming, according to an embodiment of the present disclosure. FIG. 2 illustrates an incremental sheet forming method. In at least one embodiment, the forming control unit 102 shown in FIG. 1 operates based on the flow chart shown and described with respect to FIG. 2.

At 200, the method begins by simulating an incremental sheet forming process on the structure. The simulation may be virtual or on a test structure. At 202, the geometric error over an entirety of the simulated structure is determined.

If, at 204, the resulting geometric error is acceptable, such as less than predetermined threshold (such as within the target geometric tolerance), results are accepted at 205 (and the process ends at 218), and the forming tool 108 may then operate on the structure 110 in accordance with the simulated incremental sheet forming process.

If, however, the geometric error is not acceptable, such as greater than the predetermined threshold, at 204, tool contact points (for example, contours) that are normal (for example, to current geometry or to original geometry) are offset in a direction opposite to the geometric error at 206. Then, at 208, a maximum distance is calculated between every pair of consecutive contours (for example, z-deviation) in relation to the maximum step down. At 210, it is determined if any pair has a deviation that exceeds the threshold value (that is the maximum step down). If there are no sets of consecutive contours that has a maximum vertical deviation greater than the maximum step-down at 210, the method proceeds from 210 to 211, at which the tool position is recalculated for each contact point while retaining order and orientation. The method then returns to 200. Optionally, instead of a maximum step down, embodiments of the present disclosure may utilize a maximum step over for toolpaths.

If, however, there is at least one set of consecutive contours that has a maximum vertical deviation that exceeds the maximum step-down at 210, another contour is inserted at 212 between the target contour (that is, the contour as desired) and the contour that has a maximum vertical deviation that exceeds the maximum step-down. At 214, the compensating contour is then mapped onto the structure to form a new, compensated geometry, and the method returns to 208. The process continues until all surfaces of the structure have been analyzed.

Optionally, in at least one embodiment, the process may occur in relation to a die. As such, the die may also be modified to account for the changing shape of the geometry of the structure being formed.

As used herein, the term "control unit," "central processing unit," "unit," "CPU," "computer," or the like can include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the forming control unit 102 can be or include one or more processors that are configured to control operation thereof, as described herein.

The forming control unit 102 is configured to execute a set of instructions that are stored in one or more data storage units or elements (such as one or more memories), in order to process data. For example, the control unit 102 can include or be coupled to one or more memories. The data storage units can also store data or other information as desired or needed. The data storage units can be in the form of an information source or a physical memory element within a processing machine. The one or more data storage units or elements can comprise volatile memory or nonvolatile memory, or can include both volatile and nonvolatile memory. As an example, the nonvolatile memory can comprise read only memory (ROM), programmable ROM (PROM), electrically programmable ROM (EPROM), electrically erasable PROM (EEPROM), and/or flash memory and volatile memory can include random access memory (RAM), which can act as external cache memory. The data stores of the disclosed systems and methods is intended to comprise, without being limited to, these and any other suitable types of memory.

The set of instructions can include various commands that instruct the forming control unit 102 as a processing machine to perform specific operations such as the methods and processes of the various embodiments of the subject matter described herein. The set of instructions can be in the form of a software program. The software can be in various forms such as system software or application software. Further, the software can be in the form of a collection of separate programs, a program subset within a larger program or a portion of a program. The software can also include modular programming in the form of object-oriented programming. The processing of input data by the processing machine can be in response to user commands, or in response to results of previous processing, or in response to a request made by another processing machine.

The diagrams of embodiments herein can illustrate one or more control or processing units, such as the forming control unit 102. It is to be understood that the processing or control units can represent circuits, circuitry, or portions thereof that can be implemented as hardware with associated instructions (e.g., software stored on a tangible and non-transitory computer readable storage medium, such as a computer hard drive, ROM, RAM, or the like) that perform the operations described herein. The hardware can include state machine circuitry hardwired to perform the functions described herein. Optionally, the hardware can include electronic circuits that include and/or are connected to one or more logic-based devices, such as microprocessors, processors, controllers, or the like. Optionally, the forming control unit 102 can represent processing circuitry such as one or more of a field programmable gate array (FPGA), application specific integrated circuit (ASIC), microprocessor(s), and/or the like. The circuits in various embodiments can be configured to execute one or more algorithms to perform functions described herein. The one or more algorithms can include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 3:
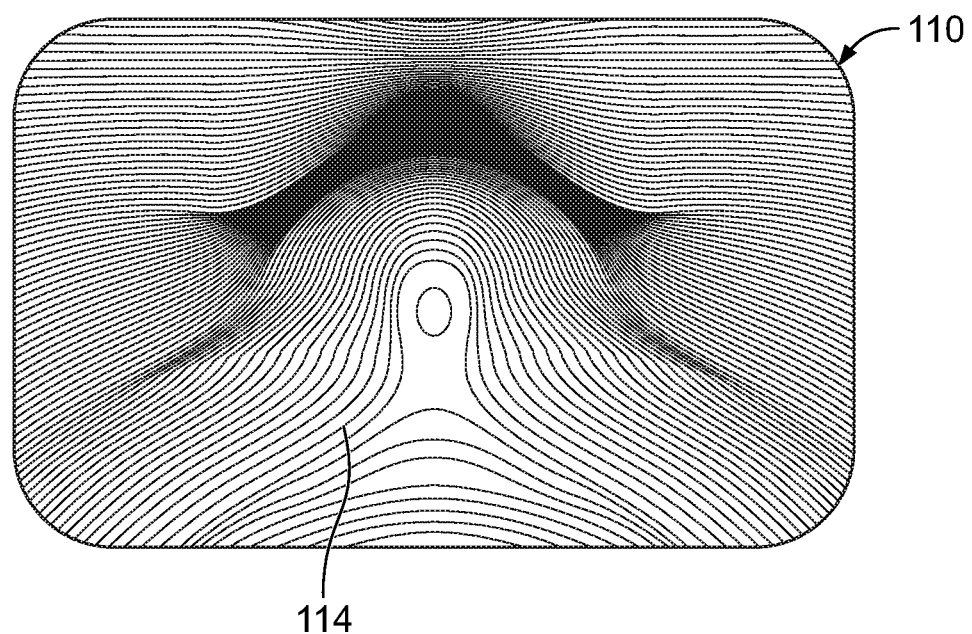
FIG. 3 illustrates a top view of a structure, according to an embodiment of the present disclosure.
Figure 4:
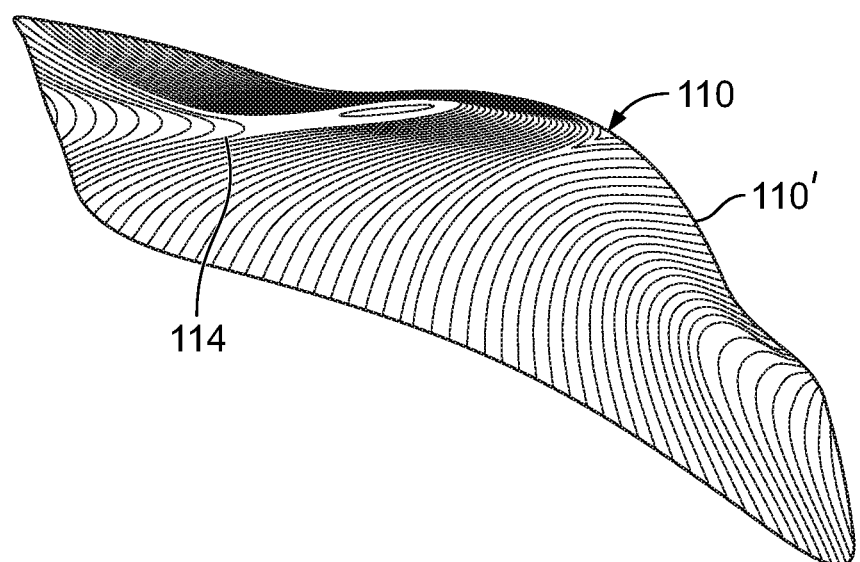
FIG. 4 illustrates a perspective lateral view of the structure of FIG. 3.

FIG. 3 illustrates a top view of the structure 110, according to an embodiment of the present disclosure. FIG. 4 illustrates a perspective lateral view of the structure 110. Referring to FIGS. 3 and 4, the toolpath 114 is superimposed onto the structure 110. The toolpath 114 is the path the forming tool 108 follows as it forms the structure 110.

Referring to FIGS. 1, 3, and 4, the forming control unit 102 determines the toolpath 114 for the structure 110, as desired (that is, as shaped as desired). In at least one embodiment, the forming control unit 102 modifies the toolpath 114 based on determined spring back, as determined during the simulated incremental sheet forming process. FIG. 11 illustrates a simplified example of an original toolpath 114a and a modified toolpath 114b. In at least one embodiment, the toolpath 114 that is used to compensate for spring back is substantially the same as the toolpath before the simulated incremental sheet forming process. In this manner, the forming control unit 102 does not substantially alter the toolpath 114, which may otherwise lead to undesirable islands on the structure 110.

In at least one embodiment, the forming control unit 102 may first map the toolpath onto a modified or target shape 110' (that is, a shape modified so as to offset the effects of spring back). Typically, in incremental sheet forming, a toolpath is determined by generating a surface by offsetting a target geometry by an amount dictated by sheet thickness, the tool shape, the tool size, and the like.

Figure 5:
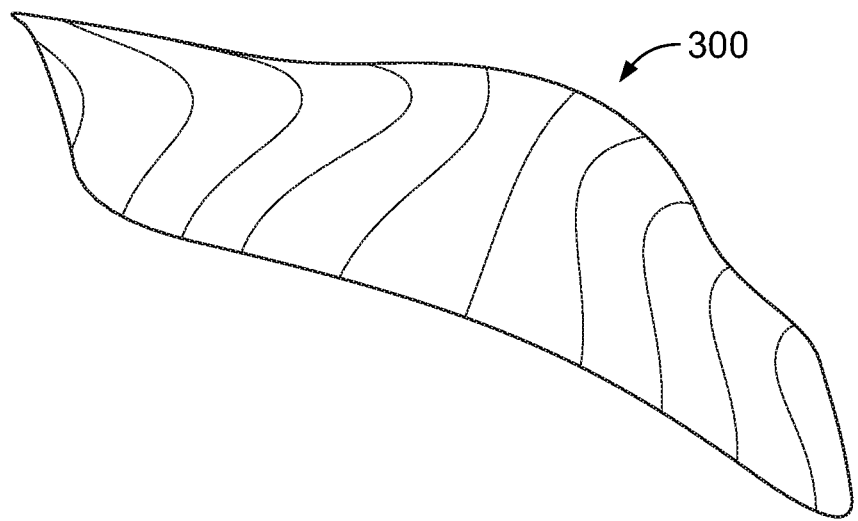
FIG. 5 illustrates a perspective lateral view of a target surface, according to an embodiment of the present disclosure.

FIG. 5 illustrates a perspective lateral view of a target surface 300, according to an embodiment of the present disclosure. The target surface 300 is a surface corresponding to a desired size and shape of a target structure (that is, the structure that is to be formed, as desired). The forming control unit 102 (shown in FIG. 1) determines the target surface 300, such as stored in the structure database 104.

Figure 6:
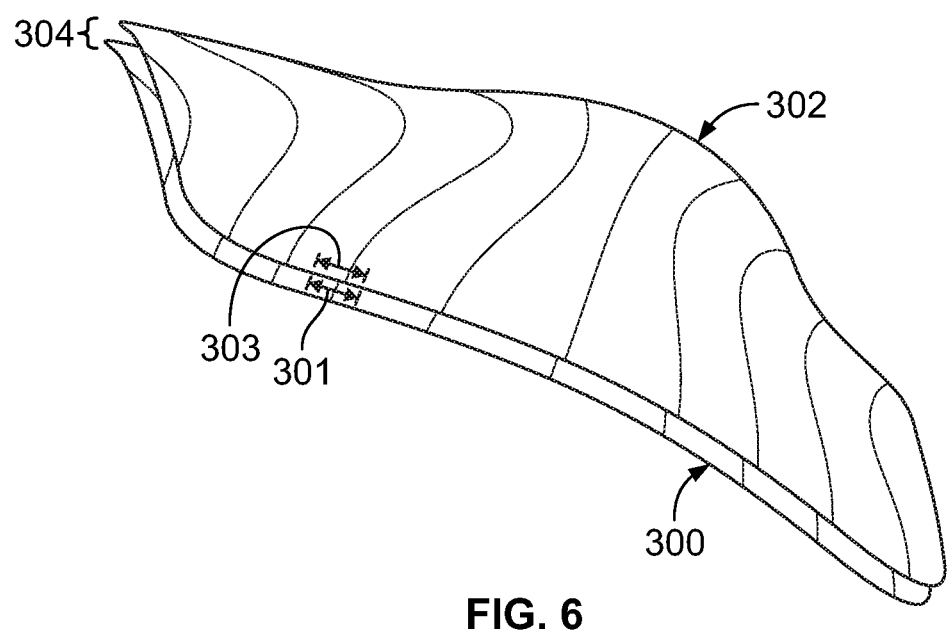
FIG. 6 illustrates a perspective lateral view of a sheet offset surface over the target surface of FIG. 5, according to an embodiment of the present disclosure.

FIG. 6 illustrates a perspective lateral view of a sheet offset surface 302 over the target surface 300, according to an embodiment of the present disclosure. The sheet offset surface 302 is separate and distinct from the target surface 300, and is offset normally from the target surface 300 by a predetermined spacing 304, such as a thickness of the structure 110 (shown in FIGS. 3 and 4). For example, the spacing 304 between the target surface 300 and the sheet offset surface 302 between corresponding normal points (for example, corresponding normal points 301 and normal points 303) is the thickness of the structure 110. The forming control unit 102 (shown in FIG. 1) determines the sheet offset surface 302, such as by constructing a surface normal from the target surface 300 at the spacing 304.

Figure 7:
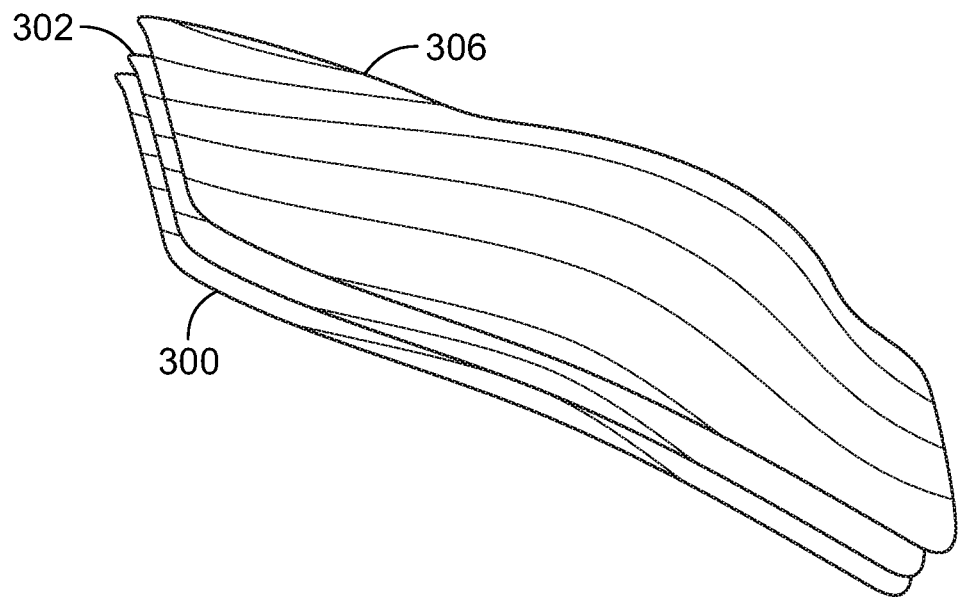
FIG. 7 illustrates a perspective lateral view of a tool-offset surface over the sheet offset surface of FIG. 6, which is over the target surface of FIG. 5, according to an embodiment of the present disclosure.
Figure 8:
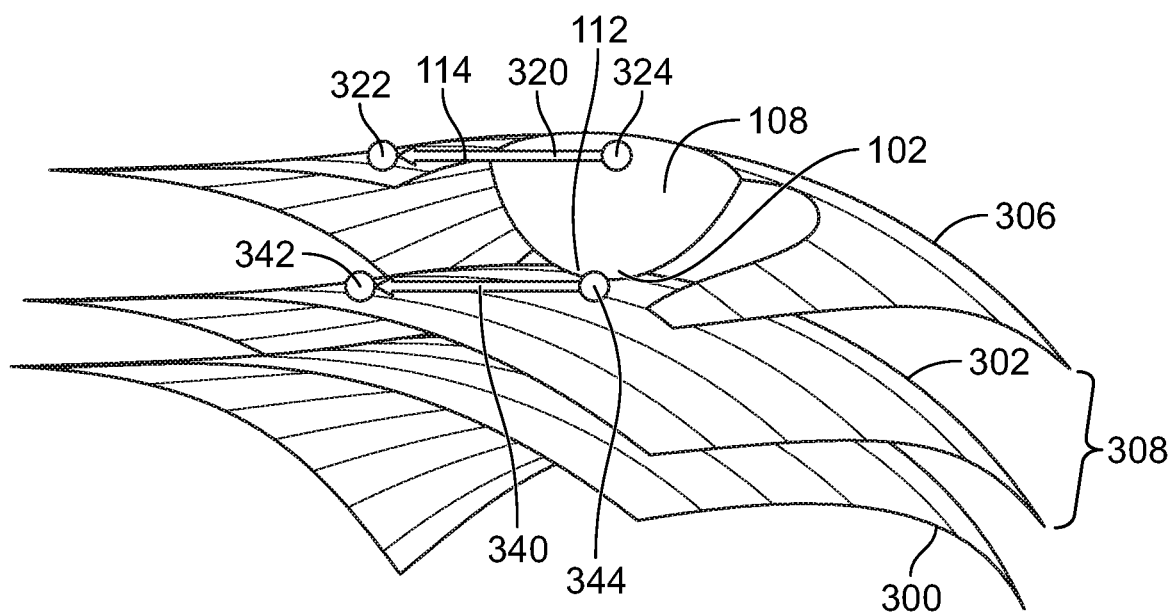
FIG. 8 illustrates a perspective internal view of the tool-offset surface over the sheet offset surface, which is over the target surface.

FIG. 7 illustrates a perspective lateral view of a tool-offset surface 306 over the sheet offset surface 302, which is over the target surface 300, according to an embodiment of the present disclosure. FIG. 8 illustrates a perspective internal view of the tool-offset surface 306 over the sheet offset surface 302, which is over the target surface 300. Referring to FIGS. 1, 7, and 8, the forming control unit 102 determines the tool-offset surface 306. The tool-offset surface 306 is a surface such that whenever a representation of the forming tool 108 (for example, a computer-generated virtual forming tool 108) is on such tool-offset surface 306, the operative end 112 of the forming tool 108 touches the sheet offset surface 302, but does not extend below the sheet offset surface 302. For example, when a predetermined point of the representation of the forming tool 108 (such as a midpoint) is on the tool-offset surface 306, the operative end 112 (for example, a distal tip or point) of the forming tool 108 touches the sheet offset surface 302 without extending below the sheet offset surface 302.

The tool-offset surface 306 may be spaced apart from the sheet offset surface 302 a predetermined distance in relation to the forming tool 108. For example, the spacing 308 between the tool-offset surface 306 and the sheet offset surface 302 may be a length of the operative end 112, a distance to a center of the forming tool 108, an entire length of the forming tool 108, or the like.

Figure 9:
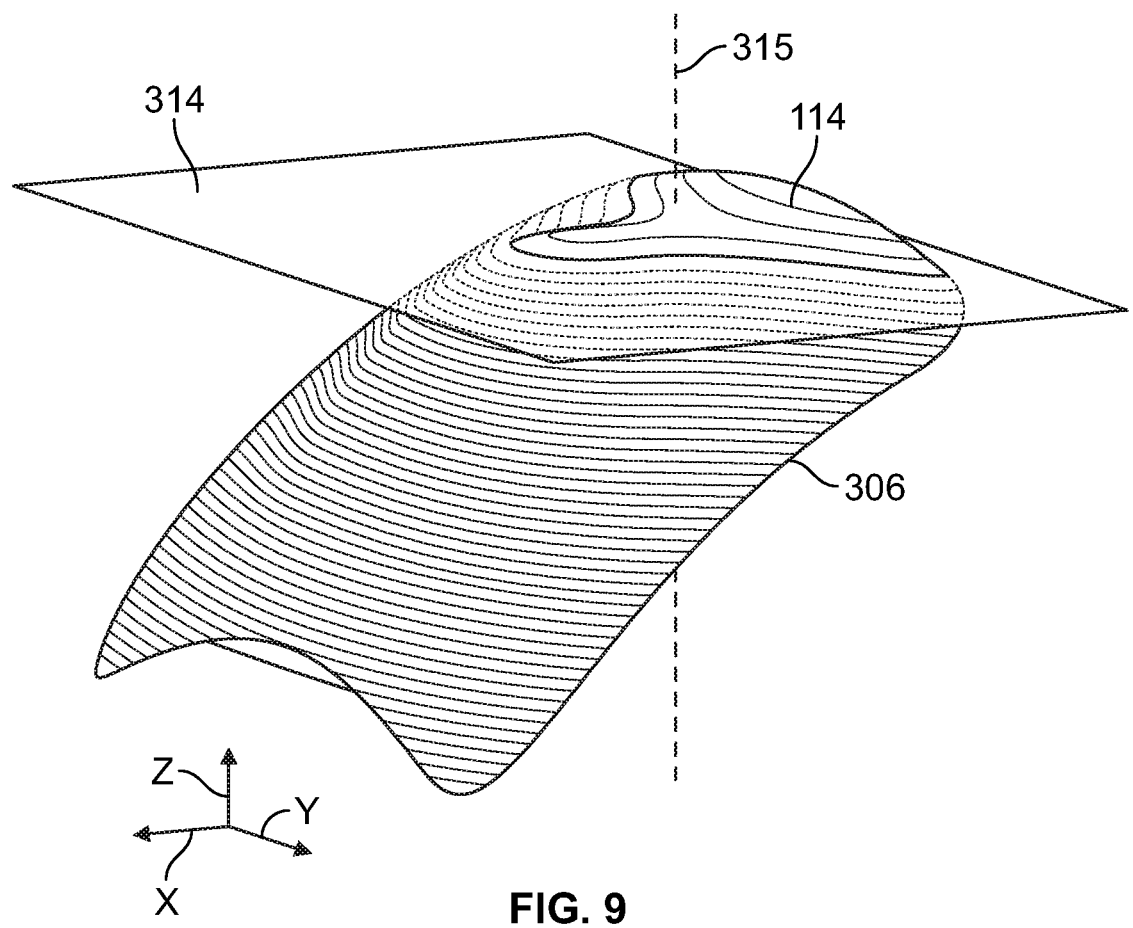
FIG. 9 illustrates a perspective view of the tool-offset surface having a toolpath, according to an embodiment of the present disclosure.

FIG. 9 illustrates a perspective view of the tool-offset surface 306 having the toolpath 114, according to an embodiment of the present disclosure. Referring to FIGS. 1 and 9, in order to determine the toolpath 114, the forming control unit 102 (for example) inserts a horizontal plane 314 along the Z axis 315. The intersection of the horizontal plane 314 at each level defines a portion of the toolpath 114. The forming control unit 102 may determine the various levels of the toolpath 114 through the maximum step-down. That is, the distance between each insertion of the horizontal plane 314 along the Z axis may be the maximum step-down. In some example, the distance between each insertion may be less than the maximum step-down. As shown, the toolpath 114 is generated and shown as level-set contours on the tool-offset surface 306.

Referring again to FIGS. 1 and 8, the toolpath is typically given as a discrete set of points that are connected by straight lines. For example, line segment 320 on the tool-offset surface 306 between points 322 and 324 defines a portion of the toolpath 114. In at least one embodiment, the forming control unit 102 maps the line segment 320 onto the sheet offset surface 302, thereby forming a line segment 340 between points 342 and 344. The line segment 340 of the sheet offset surface 302 corresponds to the line segment 320 of the sheet offset surface 302. The points 342 and 344 correspond to the points 322 and 324, respectively.

The points 342 and 344 on the sheet offset surface 302 are contact points. The contact points, as determined by the points 342 and 344, are connected by the line segment 340 to provide a full contact path. The contact path is the path at which the forming tool 108 contacts the sheet offset surface 302.

To map the toolpath 114, the forming control unit 102 applies the same transformation to the points 342 and 344 that are applied to the target surface 300, which may be a shift normal to the target surface 300. To do so, in at least one embodiment, the forming control unit 102 modifies the target surface 300 by offsetting normally. Because the sheet offset surface 302 is also defined by offsetting the target surface 300 normally, the forming control unit 102 offsets the sheet offset surface 302 directly. The forming control unit 102 can recompute the points on the tool-offset surface 306 that correspond to the points 342 and 344, and connect these by straight line segments to generate the entirety of toolpath 114.

The forming control unit 102 may determine the toolpath 114 after or before compensating for spring back in the same manner. For example, the forming control unit 102 may generate the toolpath 114 as described above with respect to FIGS. 5-9 after compensating for the spring back.

As described herein, embodiments of the present disclosure provide systems and methods for compensating for spring back in an incremental sheet forming process of forming a structure. Embodiments of the present disclosure provide systems and methods of spring forward compensation during incremental sheet forming of a structure. Further, embodiments of the present disclosure provide systems and methods of maintaining a toolpath during an incremental sheet forming process while also compensating for spring back to form a desired structural shape.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An incremental sheet forming system that is configured to form a structure through an incremental sheet forming process, the incremental sheet forming system comprising:
 a forming control unit including one or more processors, wherein the forming control unit compensates for spring back of a structure to be formed through the incremental sheet forming process by modifying at least a portion of a toolpath of a forming tool that is used to form the structure based on the spring back, wherein the forming control unit determines and generates a tool-offset surface that is separate, distinct, and spaced apart from a sheet offset surface that is separate, distinct, and spaced apart from a target surface and the tool-offset surface, and wherein the tool-offset surface includes the toolpath.

2. The incremental sheet forming system of claim 1, wherein the forming control unit determines a target shape for the structure to be formed, and simulates an incremental sheet forming operation in relation to the target shape.

3. The incremental sheet forming system of claim 2, wherein the forming control unit compares differences between the target shape and a resulting structure from the incremental sheet forming operation to determine one or more offsets that compensate for the spring back, wherein the one or more offsets relate to force vectors that oppose the spring back.

4. The incremental sheet forming system of claim 2, wherein the forming control unit virtually simulates the incremental sheet forming operation without a forming tool physically operating on the structure.

5. The incremental sheet forming system of claim 1, wherein the forming control unit determines a geometric error over an entirety of a simulated structure.

6. The incremental sheet forming system of claim 5, wherein the forming control unit offsets points on contours normal to a target geometry in response to the geometric error being greater than a predetermined threshold.

7. The incremental sheet forming system of claim 6, wherein the forming control unit determines if any set of consecutive contours has a maximum vertical deviation greater than a maximum step-down after the forming control unit offsets the points.

8. The incremental sheet forming system of claim 7, wherein, in response to there being at least one set of consecutive contours that has a maximum vertical deviation that exceeds the maximum step-down, the forming control unit inserts at least one compensating contour between a target contour and at least one contour that has a maximum vertical deviation that exceeds the maximum step-down.

9. The incremental sheet forming system of claim 8, wherein the forming control unit further maps the compensating contour onto the structure to form a compensated geometry.

10. The incremental sheet forming system of claim 1, wherein the forming control unit maps contours with at least one surface of the structure.

11. The incremental sheet forming system of claim 1, further comprising the forming tool, wherein the forming tool is configured to follow the toolpath, as modified, to form the structure.

12. The incremental sheet forming system of claim 1, wherein the tool-offset surface is a surface such that whenever a representation of the forming tool is on the tool-offset surface, a representation of an operative end of the representation of the forming tool touches the sheet offset surface, but does not extend below the sheet offset surface.

13. The incremental sheet forming system of claim 1, wherein the tool-offset surface is spaced apart from the sheet offset surface a length of an operative end of the forming tool, or a distance to a center of the forming tool.

14. The incremental sheet forming system of claim 1, wherein the forming control unit determines the toolpath by inserting a horizontal plane along a Z-axis of the tool-offset surface, wherein intersections of the horizontal plane at a plurality of levels of the tool-offset surface along the Z-axis defines at least a portion of the toolpath.

15. The incremental sheet forming system of claim 1, wherein the forming control unit determines the toolpath, at least in part, as a discrete set of points connected by one or more straight lines.

16. The incremental sheet forming system of claim 1, wherein the forming control unit continually inserts paths between undesired toolpaths by referencing a library of contours with respect to a target shape, and mapping the paths at every step.

17. The incremental sheet forming system of claim 1, wherein the forming control unit continually inserts paths between undesired toolpaths by carrying an original z-level of each path, and generating new paths between undesired contours on a target shape.

18. The incremental sheet forming system of claim 1, wherein the tool-offset surface includes points, wherein the toolpath is given as the points connected by straight lines, wherein contact points where a forming tool touches part geometry correspond to the points, and wherein the contact points lie on the sheet offset surface, and wherein the forming control unit recomputes the points on the tool-offset surface that correspond to the contact points, and connects the contact points with straight line segments to generate a full toolpath.

19. An incremental sheet forming method that is configured to form a structure through an incremental sheet forming process, the incremental sheet forming method comprising:
compensating, by a forming control unit including one or more processors, for spring back of a structure to be formed through the incremental sheet forming process, wherein said compensating comprises modifying at least a portion of a toolpath of a forming tool that is used to form the structure based on the spring back, wherein said modifying comprises determining and generating a tool-offset surface that is separate, distinct, and spaced apart from a sheet offset surface that is separate, distinct, and spaced apart from a target surface and the tool-offset surface, and wherein the tool-offset surface includes the toolpath.

20. The incremental sheet forming method of claim 19, wherein said compensating comprises:
determining a target shape for the structure to be formed; and
simulating an incremental sheet forming operation in relation to the target shape.

21. The incremental sheet forming method of claim 20, wherein said compensating further comprises comparing differences between the target shape and a resulting structure from the incremental sheet forming operation to determine one or more offsets that compensate for the spring back.

22. The incremental sheet forming method of claim 20, wherein said simulating comprises virtually simulating the incremental sheet forming operation without a forming tool physically operating on the structure.

23. The incremental sheet forming method of claim 19, wherein said compensating comprises determining a geometric error over an entirety of a simulated structure.

24. The incremental sheet forming method of claim 23, wherein said compensating further comprises offsetting points on contours normal to a target geometry in response to the geometric error being greater than a predetermined threshold.

25. The incremental sheet forming method of claim 24, wherein said compensating further comprises determining if any set of consecutive contours has a maximum vertical deviation greater than a maximum step-down after said offsetting.

26. The incremental sheet forming method of claim 25, wherein said compensating further comprises, in response to there being at least one set of consecutive contours that has a maximum vertical deviation that exceeds the maximum step-down, inserting at least one compensating contour between a target contour and at least one contour that has a maximum vertical deviation that exceeds the maximum step-down.

27. The incremental sheet forming method of claim 26, wherein said compensating further comprises mapping the compensating contour onto the structure to form a compensated geometry.

28. The incremental sheet forming method of claim 19, wherein said compensating comprises mapping contours with at least one surface of the structure.

29. An incremental sheet forming system that is configured to form a structure through an incremental sheet forming process, the incremental sheet forming system comprising:
   a forming tool; and
   a forming control unit including one or more processors, wherein the forming control unit compensates for spring back of a structure to be formed through the incremental sheet forming process by modifying at least a portion of a toolpath of the forming tool that is used to form the structure based on the spring back, wherein the forming control unit determines and generates a tool-offset surface that is separate, distinct, and spaced apart from a sheet offset surface that is separate, distinct, and spaced apart from a target surface and the tool-offset surface, and wherein the tool-offset surface includes the toolpath, wherein the forming control unit determines a target shape for the structure to be formed, and simulates an incremental sheet forming operation in relation to the target shape, wherein the forming control unit compares differences between the target shape and a resulting structure from the incremental sheet forming operation to determine one or more offsets that compensate for the spring back, wherein the one or more offsets relate to force vectors that oppose the spring back, wherein the forming control unit maps contours with at least one surface of the structure, and wherein the forming tool is configured to follow the toolpath, as modified, to form the structure.

* * * * *